(12) United States Patent
Poncz et al.

(10) Patent No.: US 11,418,919 B1
(45) Date of Patent: Aug. 16, 2022

(54) METHOD OF COMPARING LOCATIONS AND INTERACTIVE AUDIENCES

(71) Applicant: Ubimo Ltd., Tel-Aviv (IL)

(72) Inventors: Oded Poncz, Tel-Aviv (IL); Boris Teumkin, Rosh HaAyin (IL)

(73) Assignee: UBIMO LTD, Tel-Aviv (IL)

( * ) Notice: Subject to any disclaimer, the term of this patent is extended or adjusted under 35 U.S.C. 154(b) by 96 days.

(21) Appl. No.: 16/857,536

(22) Filed: Apr. 24, 2020

Related U.S. Application Data

(60) Provisional application No. 62/837,739, filed on Apr. 24, 2019.

(51) Int. Cl.
| | | |
|---|---|---|
| *H04W 4/029* | (2018.01) | |
| *G06Q 30/02* | (2012.01) | |
| *G06F 16/29* | (2019.01) | |
| *H04W 4/21* | (2018.01) | |

(52) U.S. Cl.
CPC ............ *H04W 4/029* (2018.02); *G06F 16/29* (2019.01); *G06Q 30/02* (2013.01); *H04W 4/21* (2018.02)

(58) Field of Classification Search
CPC ......... H04W 4/029; H04W 4/21; G06F 16/29; G06Q 30/02
See application file for complete search history.

(56) References Cited

U.S. PATENT DOCUMENTS

| | | | | |
|---|---|---|---|---|
| 8,751,427 | B1 * | 6/2014 | Mysen | H04W 4/024 |
| | | | | 705/347 |
| 2005/0216318 | A1 * | 9/2005 | Gray | G06Q 30/02 |
| | | | | 705/6 |
| 2006/0059225 | A1 * | 3/2006 | Stonehocker | G06F 16/9562 |
| | | | | 709/202 |
| 2010/0076968 | A1 * | 3/2010 | Boyns | G06F 16/29 |
| | | | | 715/825 |
| 2010/0153292 | A1 * | 6/2010 | Zheng | G06Q 30/02 |
| | | | | 705/347 |
| 2013/0339345 | A1 * | 12/2013 | Soto Matamala | G06F 16/248 |
| | | | | 707/722 |
| 2013/0345958 | A1 * | 12/2013 | Paek | G01C 21/3697 |
| | | | | 701/400 |
| 2014/0365944 | A1 * | 12/2014 | Moore | H04L 67/104 |
| | | | | 715/772 |
| 2017/0031974 | A1 * | 2/2017 | Patil | G06F 16/24 |
| 2017/0053022 | A1 * | 2/2017 | Chan | G06F 16/9535 |

(Continued)

FOREIGN PATENT DOCUMENTS

| | | | | | |
|---|---|---|---|---|---|
| CA | 2579312 | C | * | 6/2013 | ......... G06F 16/9562 |
| CN | 108430050 | A | * | 8/2018 | |
| EP | 3340159 | A1 | * | 6/2018 | ............. G06F 16/29 |

*Primary Examiner* — Matthew C Sams

(74) *Attorney, Agent, or Firm* — Baker Botts, L.L.P.

(57) ABSTRACT

A method and system for recommending locations based on audience interaction metrics is provided. In various embodiments, recommendations for actions at a location are generated based on existing location data and audience metrics at the existing locations. In various embodiments, recommendation data is generated for existing locations based on similarity to a first selected location. In various embodiments, location recommendation data is generated based on a selection of audience metrics of certain degrees of interaction. In various embodiments, negligible and non-existent audience interactions are substitutes to generate an optimized location recommendation.

17 Claims, 10 Drawing Sheets

(56) References Cited

U.S. PATENT DOCUMENTS

2018/0300660 A1\* 10/2018 Coan ............... H04W 4/029
2019/0149943 A1\* 5/2019 Ledvina ............ H04W 4/20
                                                                                 455/456.1
2019/0339833 A1\* 11/2019 Moore ............... G01C 21/36

\* cited by examiner

| | A1 | A2 | A3 | A4 | ... | A77 | A78 | A79 | A80 |
|---|---|---|---|---|---|---|---|---|---|
| BB00 → | 0.67 | 1.01 | 0.44 | 0.57 | | 0.32 | - | 0.75 | 0.71 |
| BB01 | 1.44 | 1.01 | 4.11 | 2.54 | | 2.02 | - | 1.38 | 1.57 |
| BB02 | 0.67 | 1.01 | 0.44 | 0.57 | | 0.32 | - | 0.75 | 0.71 |
| BB03 | 1.15 | 1.06 | 1.37 | 1.61 | | 2.09 | - | 1.30 | 1.27 |
| BB04 | 0.68 | 0.72 | 0.45 | 0.54 | | 0.58 | - | 0.77 | 1.06 |
| BB05 | 0.89 | 0.87 | 0.98 | 0.82 | | 1.07 | - | 1.12 | 0.83 |
| BB06 | | 0.49 | | | | 1.57 | - | | 1.86 |
| BB07 | | 0.78 | | | | 0.86 | - | | 1.74 |
| BB08 | 1.03 | 0.97 | 1.91 | 1.30 | | 1.19 | 0.39 | 1.15 | 1.39 |
| BB09 | 0.98 | 1.04 | 4.42 | 2.05 | | 1.27 | - | 1.25 | 1.31 |
| BB10 | 1.00 | 0.91 | 1.11 | 1.05 | | 1.08 | - | 1.05 | 1.08 |
| ⋮ | | | | | | | | | |
| STD | 0.32 | 0.26 | 0.78 | 0.53 | ... | 0.66 | 0.47 | 0.17 | 0.43 |

| | |
|---|---|
| BB00 → | |
| BB01 | 7.53 |
| BB02 | 16.7 |
| BB03 | 19.5 |
| BB04 | 8.41 |
| BB05 | 20.7 |
| BB06 | 22.51 |
| BB07 | 26.84 |
| BB08 | 9.53 |
| BB09 | 9.4 |
| BB10 | 17.7 |
| ⋮ | |

FIG. 4

METHOD OF COMPARING LOCATIONS AND INTERACTIVE AUDIENCES

CROSS-REFERENCE TO BENEFIT CLAIM

This application claims the benefit under 35 U.S.C. § 119(e) of provisional application 62/837,739, filed Apr. 24, 2020, the entire contents of which is hereby incorporated by reference for all purposes as if fully set forth herein.

FIELD OF THE DISCLOSURE

One technical field of the present disclosure is the electronic digital calculation of the geographical locations of mobile computing devices, location comparison, and selection services. Another technical field is the optimization of the efficiency of network transmission of digital content based on audience metric collection and comparison. Another technical field is the optimization of the efficiency of network transmission of digital content based on the application of audience metrics and characteristics to generate location recommendation data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The transmission of certain electronic digital content over internetworks and other digital transmission networks, from servers to mobile computing devices, tends to be inefficient. Digital content is often transmitted that is not needed by and not relevant to particular mobile computing devices, wasting network bandwidth, server storage, and memory resources. Social sales fields such as product retail, tourism, and online couponing services operate with great dependency on the ability to reach and advertise to particular human demographics that are likely to interact with a product or service operated by a company or entity. It is critical for advertising entities to carefully pick and choose a method, location, content, and the particular audience of an advertisement, among other many important considerations, for the purpose of maximizing the efficiency of the transmission of digital content. If an advertisement or solicitation is distributed to a crowd of consumers who are unlikely to interact with the target goods and/or services, then valuable computing, storage, and network resources are wasted and the return on the cost, or advertising investment, is minimal.

Consequently, resources that are better spent appealing to a more proper audience and advancing the advertiser's interests are not properly utilized. Efficient use of advertising resources and careful logistical planning are necessary to maximize returns on investment in these fields. Two key decisions are the location in which to place an advertisement and the intended audience the advertisement should reach.

A common method of planning a location for a new advertisement or solicitation is to use previous examples of successful interaction. For example, if a large number of consumers indicate a particular advertisement leading to a purchase, the location and audience of the advertisement were likely successful. Similar venues catering to similar audiences may be indicators of success for further advertisements. In optimal cases, new similar locations may have an even more efficient location and audience demographics to interact with the advertisement.

However, no two locations share exactly the same coordinates or audience demographics, and placing multiple advertisements in the same location is a highly inefficient action for advertising entities. Additionally, there is no concrete method to definitively determine the likelihood that advertisements in two locations will have the same effect on an audience. Two locations, even those in close proximity, may be patronized by very different types of audiences based on a nearly unlimited number of factors, including zoning laws, residential property, food/bar establishments, business or educational institutions, or a host of other factors.

Present methods of determining an optimal location for advertisement consist of manually interpreting demographic data to guess which locations are likely to cater to a particular audience. Such practices are subject to high rates of human error and may be based on incomplete or even incorrect data. For example, observing an audience on a Saturday night at a location is typically very different than observing an audience during a Tuesday morning. Manually scouting and selecting a location based on anecdotal evidence is a potentially catastrophic business practice that is exacerbated when performed in volatile fields such as advertising, solicitation, and digital couponing.

SUMMARY

The appended claims may serve as a summary of the invention.

BRIEF DESCRIPTION OF THE DRAWINGS

In the drawings:

FIG. 4 illustrates an example audience metric table according to various embodiments.

DETAILED DESCRIPTION

Figure 1:
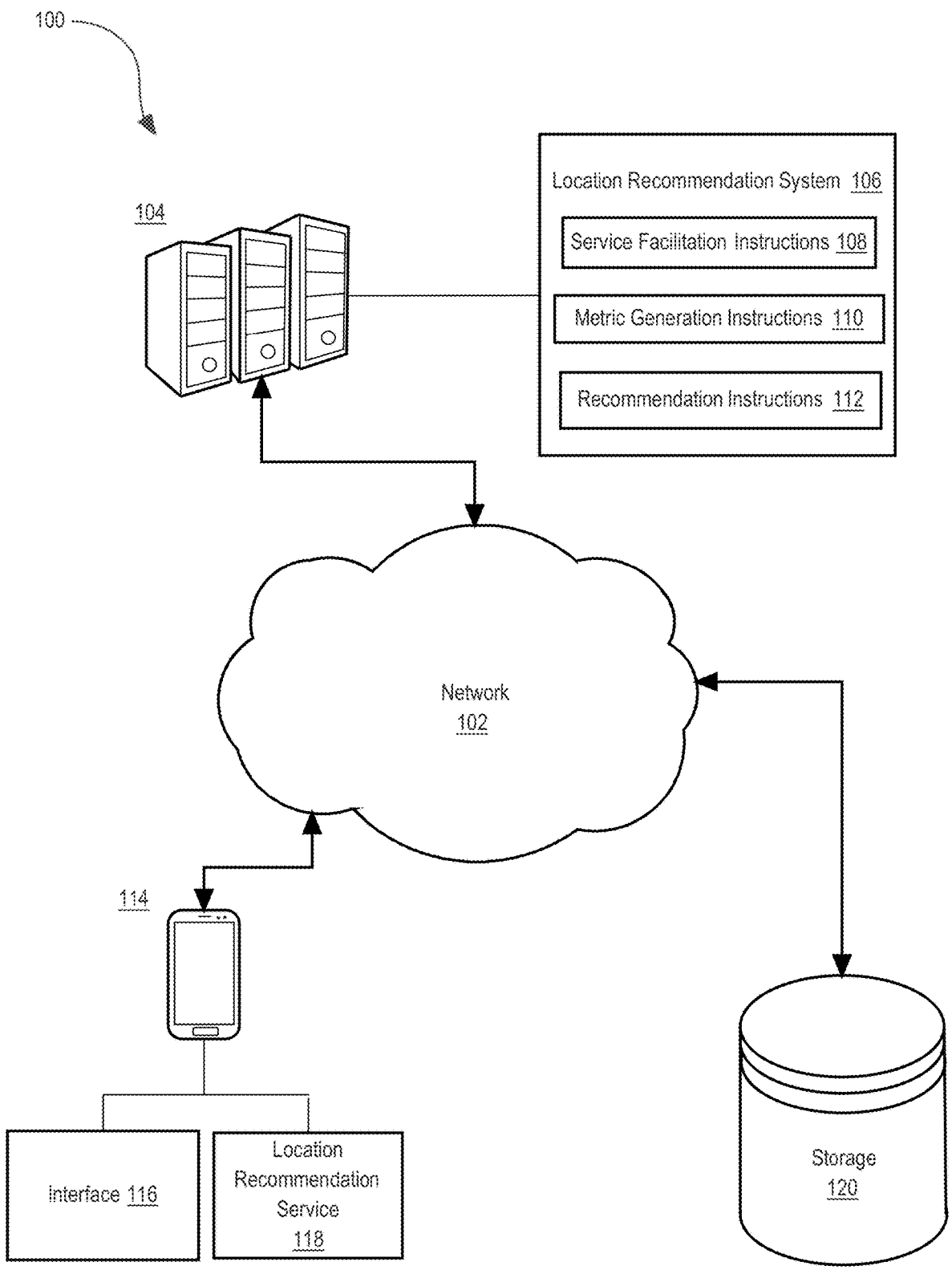
FIG. 1 illustrates an example networked computer system with which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. GENERAL OVERVIEW
2. EXAMPLE COMPUTING ENVIRONMENTS AND COMPUTER COMPONENTS
3. EXAMPLE PROCESS AND SYSTEM FOR RECOMMENDATION OF OPTIMIZED LOCATIONS
   3.1 GENERATING AND STORING AUDIENCE METRICS FOR LOCATIONS
   3.2 PROVIDING LOCATION RECOMMENDATIONS BASED ON A KNOWN LOCATION
   3.3 MAPPING AND DISPLAYING LOCATION RECOMMENDATIONS
   3.4 PROVIDING LOCATION RECOMMENDATIONS BASED ON A KNOWN AUDIENCE
4. HARDWARE AND SOFTWARE OVERVIEW
5. PRACTICAL APPLICATIONS

1. General Overview

In an embodiment, a computer-implemented method generates location recommendation data corresponding to a geographical area for suggested activities. The recommendation is based on measured attributes of audiences associated with the recommended location. Generated location recommendations may relate to a suggested optimal location at which an entity may have access to an optimal audience. For example, a particular location may correspond to a high rate of human traffic, wherein many of the humans passing through the location are an optimal target demographic for advertising or soliciting a good or service. In example embodiments, an optimal recommended location may be generated corresponding to an existing location selected by a user of the computer-implemented method. For example, a user may desire knowledge of a location which experiences traffic which is very similar to another location which has successfully reached a core demographic audience.

A computer-implemented method for generating recommendation data regarding a particular location will allow an entity to reach a particular demographic in a highly efficient manner versus manually guessing or speculating on an alternative location. Using generated audience metrics and comparisons between multiple relevant locations, the method will generate optimal locations for the efficient expenditure of precious resources while eliminating risks of human error and diminishing investment returns. Additionally, the computer-implemented method will free valuable electronic and computing resources otherwise spent to speculate on possible locations. Tailoring a method in this manner saves human resources otherwise spent speculating and observing audience trends, computer resources otherwise spent researching and facilitating location procurements, and time resources spent determining a viable location.

The computer-implemented method may be utilized to receive digital electronic first location data representing a first geographical location associated with one or more audiences, each audience comprising a plurality of electronic identifiers that share at least one metadata attribute. The first location data may correspond to an initial location that serves as a model for future locations based on successful activities at the first location. The recommendation may be requested by an entity that seeks to utilize an additional area for interaction with a public audience. The audience may be a modeled entity representing human or digital resources that utilize activities at the location and interact with features in the requesting entity. Audience data may be gathered using electronic features such as location-tracking, digital feedback, flocking algorithms, social media interaction, or any other activity which may be captured and quantified by an electronic system. The electronic system may store audience information using digital identifiers comprising metadata attributes which can be groups according to audience activities.

The computer-implemented method may then be utilized to generate and store, in digital data storage, one or more first audience metrics for the first geographical location, the first audience metrics corresponding to a degree of networked computer interaction between each audience of the one or more audiences and the first geographical location. The audience metrics may be based on the plurality of digital identifiers having metadata attributes and may quantify audience interactions in a discernible way. For example, particular identifiers and metadata attributes may be quantified to create a set of score values for a particular location that encompasses the full audience statistics for a particular location. The interaction between the audience and the location may be tracked with a network in real-time, allowing a recommendation system to pull relevant audience metrics from a database or generating them in real-time.

The computer-implemented method may then be utilized to receive, from a computer database, second geographical location data, the second geographical location data representing one or more additional geographical locations associated with the one or more audiences, the second geographical location data comprising one or more second audience metrics for each additional geographical location. The second geographical location data may correspond to a plurality of locations different than the first location which are suitable geographical areas for an entity to perform actions similar to those performed at the first location. For example, the one or more additional geographical locations may be associated with an advertising medium such as a billboard or digital display which presented advertising opportunities similar to those in the first location. The second geographical location data includes audience metrics which can be used to compare audience interactions at those particular areas with audience interactions at the first location in order to determine relevant similarities.

The computer-implemented method may then be utilized to generate and digitally store location recommendation data comprising at least one additional geographical location of the one or more additional geographical locations based on the one or more first audience metrics and the one or more second audience metrics. Recommendation data may comprise a number of recommended additional locations similar to the first location which are suitable for efficient interactions with audiences. For example, the computer-implemented method may determine one or more additional locations with expected or better audience metrics for the purposes of a requesting entity and subsequently send recommendation data to that entity corresponding to the additional locations.

These techniques provide technical solutions, embodied in computers that use a specific architecture or arrangement and programming methodology to execute specific sequences of steps, to the technical problems outlined in the Background. In particular, the disclosed solutions provide an improved electronic digital calculation of the geographical locations of mobile computing devices, location comparison, and selection services. The disclosed solutions also lead to optimization of the efficiency of network transmission of digital content based on audience metric collection and comparison, and optimization of the efficiency of network transmission of digital content based on the application of audience metrics and characteristics to generate location recommendation data.

The drawing figures and all of the description and claims in this disclosure are intended to present, disclose and claim a technical system and technical methods in which specially programmed computers, using a special-purpose distributed computer system design, execute functions that have not been available before to provide a practical application of computing technology to the technical problems set forth in the Background. Specific technical solutions are identified in the preceding paragraphs and in subsequent paragraphs. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

2. Example Computing Environments and Computer Components

FIG. 1 illustrates an example networked computer system with which various embodiments may be practiced. FIG. 1 is shown in simplified, schematic format for purposes of illustrating a clear example and other embodiments may include more, fewer, or different elements.

Computer system 100 comprises example elements that may implement the computer methods, systems, and media discussed herein. System 100 comprises network 102. Network 102 may be any network or connective channel capable of facilitating communication and cooperation between two or more entities of system 100. Network 102 may be a mobile network, wireless network, wired network, internetwork, intranet, local area network, cloud-network, or any other entity capable of operation as depicted and described herein, or a combination of multiple instances of the foregoing acting in cooperation.

System 100 comprises back-end system 104. Back-end system 104 may be any electronic device or system of electronic devices capable of performing the methods and processes described herein. In an embodiment, back-end system 104 is a system owned and operated by a sales entity such as an advertiser, solicitor, or digital couponing purveyor and is capable of performing methods and processes for generating location recommendation data. Back-end system 104 may comprise various system instructions and/or software packages via a software system such as location recommendation system 106. Location recommendation system 106 may be any software or instructions capable of running on back-end system 104 and capable of facilitating the methods and systems described herein.

Location recommendation system 106 comprises service facilitation instructions 108. In various embodiments, service facilitation instructions 108 instructions executable by location recommendation service 106 in order to facilitate the operation of a service that recommends locations and generates location recommendation data. In various further embodiments, service facilitation instructions 108 interacts with other devices and services over network 102 in order to generate and send location recommendation data to other entities.

Location recommendation system 106 comprises metric generation instructions 110. In various embodiments, metric generation instructions 110 are instructions executable by location recommendation system 106 to generate, store, request, and receive metric data related to audiences at particular locations. Location recommendation system 106 comprises recommendation instructions 112. In various embodiments, recommendation instructions 112 are instructions that are executable by location recommendation system 106 in order to generate and store location recommendation data for use as part of the methods and systems described herein.

System 100 further comprises user device 114. User device may be a device used by a customer or facilitating operator to request and receive a location recommendation. For example, a user may use user device 114 to request a location recommendation by communicating with back-end system 104 through network 102. User device 114 comprises interface 116. Interface 116 is a display-integrated software element of user device 114 capable of allowing a user of user device 114 to request and view a location recommendation. User device 114 comprises the location recommendation service 118. Location recommendation service 118 may operate as a back-end software service for user device 114 through which location recommendation data may be sent and received in conjunction with interface 116.

System 100 further comprises storage 120. Storage 120 may be any device, entity, hardware, software, memory, or other storage usable as part of the processes, methods, and systems described herein. In various embodiments, storage 120 is a database system or device which stores, in a computer memory, data and/or metrics relevant to the generation of a location recommendation.

3. Example Process and System for Recommendation of Optimized Locations

Figure 2:
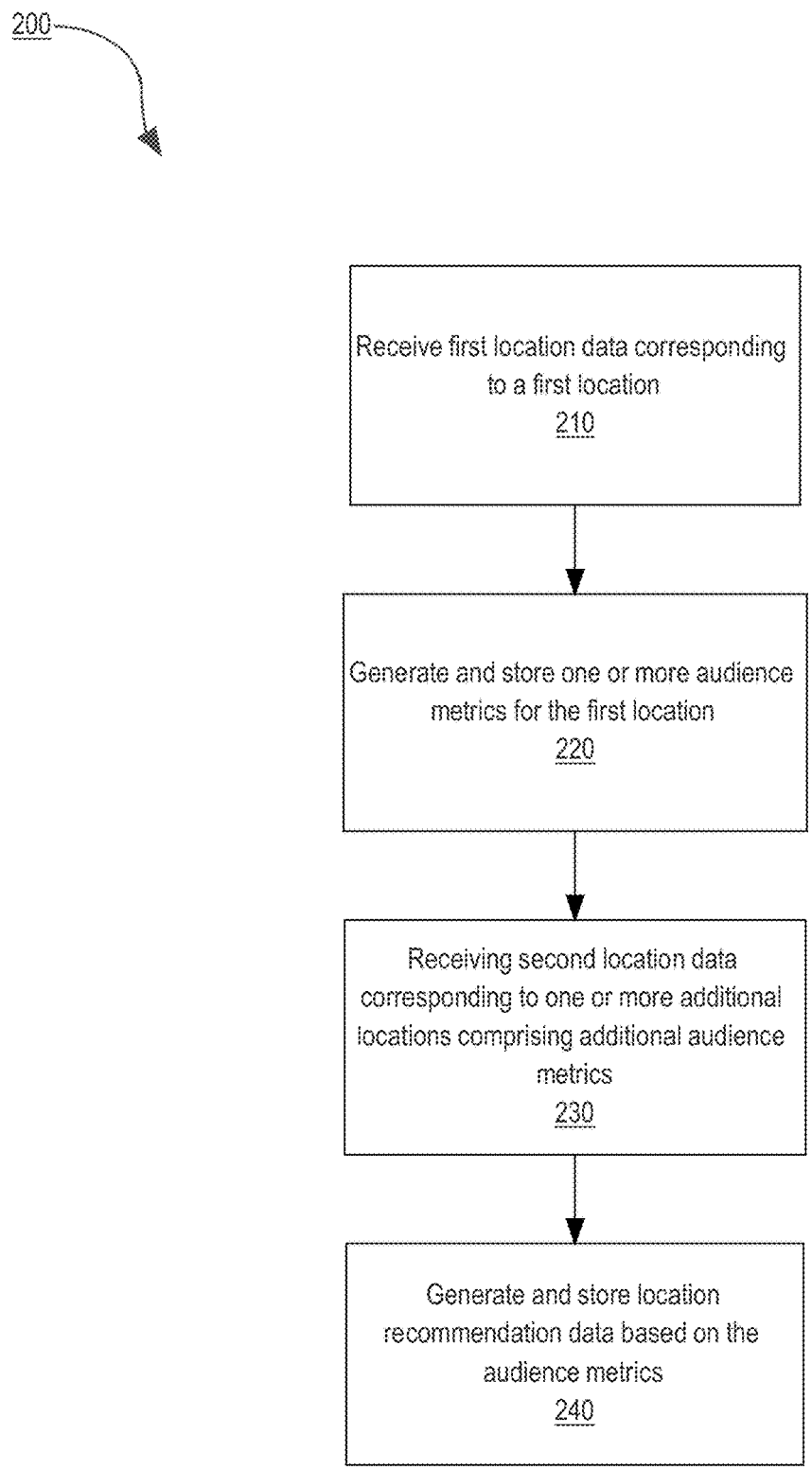
FIG. 2 illustrates a location recommendation process according to various embodiments.

FIG. 2 illustrates a location recommendation process according to various embodiments. FIG. 2 is shown in simplified, schematic format for purposes of illustrating a clear example and other embodiments may include more, fewer, or different elements connected in various manners. FIG. 2 is intended to disclose an algorithm, plan, or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

The example process 200 depicted in FIG. 2 starts with receiving first location data corresponding to a first location. The example process then comprises generating and storing one or more audience metrics for the first geographical location. Next, the process comprises receiving second location data corresponding to one or more additional locations and comprising one or more additional audience metrics. Finally, the process comprises generating and digitally storing location recommendation data based on the audience metrics.

Returning to step 210, process 200 begins by receiving first location data corresponding to a first location. In various embodiments, step 210 comprises receiving digital electronic first location data representing a first geographical location associated with one or more audiences, each audience comprising a plurality of electronic identifiers that share at least one metadata attribute. In various embodiments, the first location data is received from a device or interface as part of a process for requesting and generating location recommendation data. For example, a user device may begin a location recommendation process such as process 200 by sending first location data relating to an existing location. The existing location may be a location associated with successful audience interaction experiences, and therefore a good model for additional audience experiences at additional locations.

In various embodiments, the first location data comprises a real name or pseudonym of a location. In various embodiments, the first location data comprises coordinates directly input or taken from input on a map. In various embodiments, the first location data is digital electronic data received from an electronic device and process at another electronic device.

As discussed herein, an audience may be any entity representing interactions with a location or an object/item at a location. In various further embodiments, an audience is represented by a plurality of digital data representing entities passing a location and collected digitally in real-time. For example, a particular area may be frequently traversed by human users, each of which carries a smartphone or device on their person. Back-end services on the smart devices may track the location of a user as they enter and exit the location and may track and store additional metrics as metadata, such as the time spent in a location, time spent facing in a direction at a location, and/or frequency of visits to the location. In various embodiments, other personification data is stored relating to the location, such as the age, the buying habits, the reactions to advertisements, the gender, and/or the affiliated digital actions of an audience while in the location.

In various embodiments, the first location data comprises a plurality of locations. For example, the first location data may comprise two or more locations which correspond to successful operations at the particular locations in reaching a demographic audience and indicate a successful marketing campaign. The plurality of locations comprising the first location data may be used to facilitate any of the processes described herein, including the generation of location recommendation data, and are interchangeable with any described instances of a single location. In various embodiments, sending the first location data comprises sending a unique electronic identifier corresponding to the first location which is recognizable by a back-end system or location recommendation system.

At step 220, process 200 proceeds by generating and storing one or more audience metrics for the first location. In various embodiments, step 220 comprises generating and storing in digital data storage, one or more first audience metrics for the first geographical location, the first audience metrics corresponding to a degree of networked computer interaction between each audience of the one or more audiences and the first geographical location. In various embodiments, generating the one or more first audience metrics comprises requested and receiving existing metric information for the first location from a digital storage. In various embodiments, the first audience metrics are derived in real-time based on the received first location data. For example, in response to receiving an indication of a first location with which to generate an additional location recommendation, a system may compute real-time statistics and audience metrics for the location to be used in the recommendation process. Those metrics may then be stored for later use or processes as part of the current or future location recommendations.

In various embodiments, the first audience metrics are derived from a degree of networked audience interaction at a first location. For example, a sports arena venue may process a multitude of payments digitally using a network during a sporting event. The payment data of the event are stored by the network and subsequently sent to a recommendation system for future use in a location recommendation system. The payment data is then converted to a set of audience metrics indicating particular attributes present among the multitude of transactions processed during the event. In various embodiments, the audience metrics may be generated, stored, and utilized in a format that is comparable to other audience metrics. In various further embodiments, audience metrics are numerical values such a floating-point number which are comparable to other standard floating-point numbers.

At step 230, process 200 proceeds by receiving second location data corresponding to one or more additional locations comprising additional audience metrics. In various embodiments, step 230 comprises receiving, from a computer database, second geographical location data, the second geographical location data representing one or more additional geographical locations associated with the one or more audiences, the second geographical location data comprising one or more second audience metrics for each additional geographical location. In various embodiments, the second location data is received in response to a request for relevant second location data with which to make a location recommendation. In various embodiments, the second location data comprises one or more additional locations that are different than the first location. In various further embodiments, the one or more additional locations are only locations at which an event may occur that may also occur at the first location. For example, the second location data may comprise only locations with a digital billboard if the first location is identified as having a digital billboard.

In various embodiments, the second location data comprises a second set of audience metrics corresponding to audience interactions with the one or more locations. For example, for each additional location in the second location data, a set of audience metrics may be stored for comparison to the first audience metrics. In various embodiments, the second location data comprises only additional locations having at least one audience attribute in common with the first location. For example, if a bar is identified as a first location, the second location data may contain only additional locations having audience metrics corresponding to audiences over the age of twenty-one years old.

At step 240, process 200 comprises generating and storing location recommendation data based on the audience metrics. In various embodiments, step 240 comprises, based on the one or more first audience metrics and the one or more second audience metrics, generating and digitally storing location recommendation data comprising at least one additional geographical location of the one or more additional geographical locations. In various embodiments, the location recommendation data comprises one or more additional locations selected as the most similar to the initially received first location data. For example, in response to receiving the first location data, a recommendation may include one or more additional locations having the most similar audience metrics compared to the first location.

In various embodiments, the one or more additional locations included in the location recommendation data are derived numerically from the audience metrics of the first location and the additional locations. For example, selecting a recommended additional location may comprise generating difference metrics between the first audience metrics and the second audience metrics. Based on the difference metrics, an additional location may be selected as corresponding most closely to the first location For example, a difference metric may represent the degree of difference between the first audience metrics of the first location and the second audience metrics of an additional location. As a result, only locations have a difference metric below a certain point, or the lowest difference metric, may be selected as part of the location recommendation data.

Figure 3:
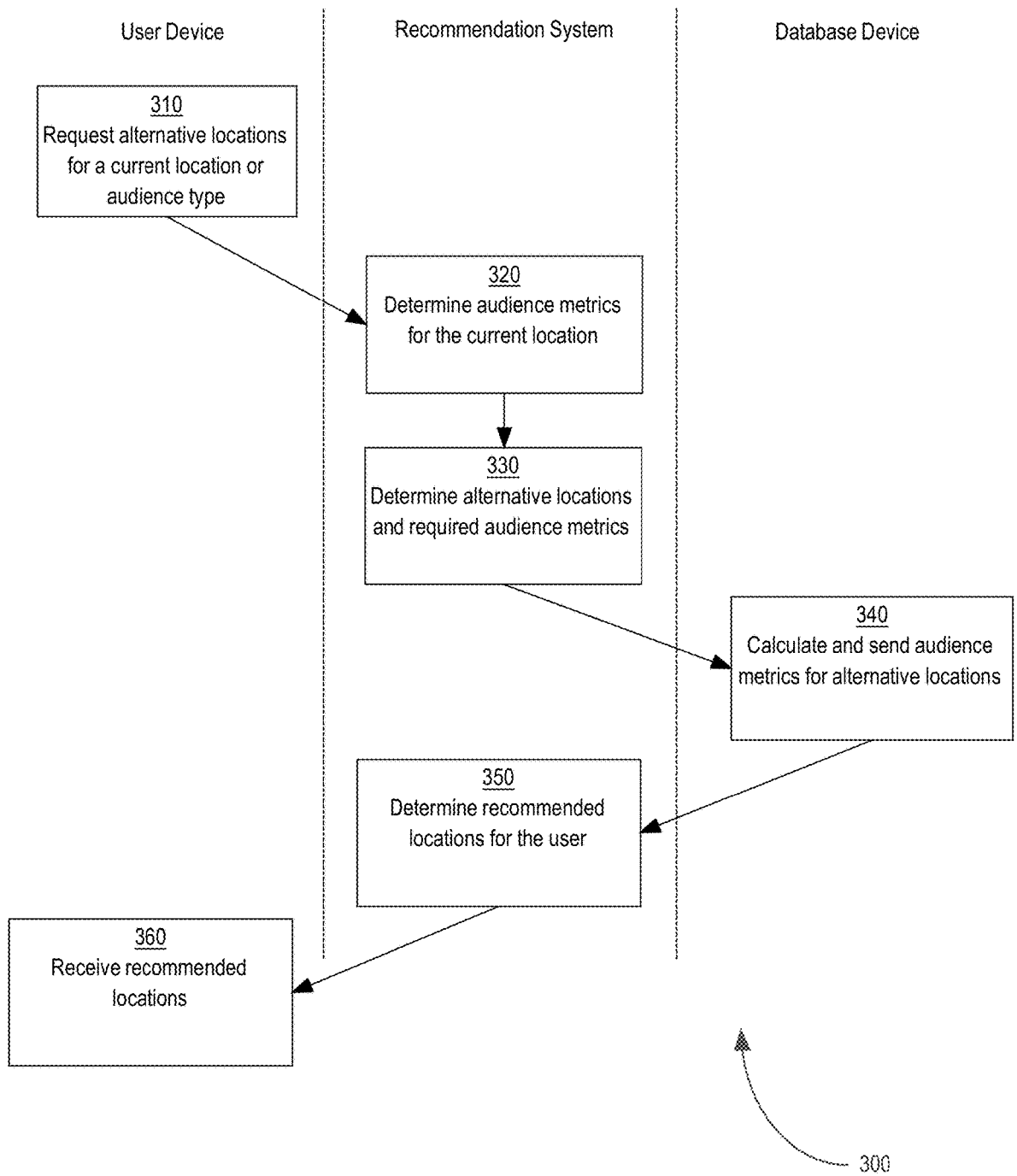
FIG. 3 illustrates a location recommendation system according to various embodiments.

FIG. 3 illustrates a location recommendation system according to various embodiments. FIG. 3 is shown in simplified, schematic format for purposes of illustrating a clear example and other embodiments may include more, fewer, or different elements connected in various manners. FIG. 3 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

The example system 300 depicted in FIG. 3 comprises three devices or entities, including a user device, a recommendation system, and a database device. In various embodiments, the user device is similar to user device 114, the recommendation system is similar to back-end system 104 and location recommendation system 106 and the database device is similar to storage 120. In various further embodiments, system 300 uses these entities to facilitate processes similar to process 200.

System 300 begins at step 310 when the user device requests alternative locations for a current location or audience types. The user device may request alternative locations for potential activity based on an existing location or another attribute such as an audience metric. In various embodiments, the request is generated from an Application Programming Interface (API) at the user device which is designed to generate requests and responsively receive generated location recommendation data.

At step 320, the recommendation system receives the request and determines audience metrics for the current location. Determining audience metrics may include receiving existing audience metrics for a first location or a requested audience metric from the database or actively generating and storing new metrics. At step 330, the recommendation system determines alternative locations and required audience metrics to compare to the current location or audience type. The recommendation system may communicate this necessary location data to the database device to continue the process. At step 340, the database device calculates and sends audience metrics for the alternative locations to the recommendation system.

At step 350, the recommendation system uses the received audience metrics for the alternative locations and the metrics for the current location to determine recommended locations for the user. The recommendation system may use the received and generated metrics to generate data relating to an optimal or efficient additional location corresponding to the request received at step 310. At step 360, the user device receives the determined recommendation locations from the recommendation system.

A venue, place, or point of interest as used herein may be a geographic location that can be described by a latitude, longitude and a radius or polygon. The venue or place can also have other attributes like name, category, etc. A venue, place or point of interest may be any entity in a location, including a digital screen or a physical billboard. An audience or segment as used herein may be a set of identifiers, such as electronic IDs, email addresses, device IDs, etc., that share a common attribute. Common attributes may be any common or shared facet or action, such as a group of fast-food customers, a group of owners of similar pets, a group of listeners to the same music band, etc. A lift as used herein may be a calculated ratio between the share of the audience in the venue to the share of the audience in a control group. For example, if a population of people at a sports arena has an audience attribute corresponding to basketball supporters at a percentage of 95% among the total arena population and a percentage of 20% among a control group, then the calculated lift of the sports arena with respect to the audience of basketball supporters is 0.95/0.2=4.75. Sometimes the lift cannot be calculated due to a lack of data or because the denominator in the calculations above is zero. In this case the lift's value will be a missing value, possibly represented by a string such as "NaN".

3.1 Generating and Storing Audience Metrics for Locations

To generate efficient and optimal location recommendations, current accurate and applicable information on audiences must be known. In various embodiments, presenting audience information in the form of numerical or mathematically modeled metrics allows the location recommendation system to easily compare audience statistics and proclivities to make an accurate recommendation. For example, converting electronic identifiers and metadata attributes into numerical metrics allows metrics for locations and audiences to be easily compared.

FIG. 4 illustrates an example audience metric table according to various embodiments. Specifically, FIG. 4 depicts a table of audience metrics that are numerically quantified for more easily generating a location recommendation. FIG. 4 depicts data system 400. Data system 400 may be any example data system, table, storage, volatile memory, or other entity capable of storing and transferring audience metrics to other portions of a location recommendation system. Data system 400 comprises data table 410. Data table 410 may be a standard database table such as a digital data table written in Structured Query Language (SQL) and capable of looking up and conveying data from the table to other portions of a location recommendation system. In various embodiments, data table 410 is hosted in a storage medium such as storage 120 or another database connected to a location recommendation system.

In various embodiments, data table 410 is a directed data table relating to a specific subcategory of places or entities to be used in recommendation data. For example, data table 410 is structured to compare advertising billboards at specific locations to audience metrics that interact with those billboards. Data table 410 comprises location identifiers 420. Location identifiers 420 correspond to a location or an entity at a location that is subjected to audience interaction. For example, location identifiers in FIG. 4 use the prefix "BB" to indicate that the location identifiers 420 relate to rows describing a specific advertising billboard at a corresponding location. "BB0" is shown as the "ORIGIN" identifier, which may be the received first location to which all additional locations are compared to make a recommendation.

Data table 410 comprises audience metric identifiers 430. Audience metric identifiers 430 correspond to an audience interaction metric which is measurable. For example, audience metric identifiers depicted in FIG. 4 use the prefix "A," indicating that the columns of the data table 410 correspond to specific types of audiences that interact with billboards. There may be any number of location identifiers 420 or audience metric identifiers 430 as necessary to perform the generation of a location recommendation. At the tabular intersection of a particular location identifier 420 row and a particular metric identifier 430 column is a particular audience-location metric 440. A particular audience-location metric 440 corresponds to a numerically derived representation of a specific audience's degree of interaction with a specific location. For example, at the intersection of row "BB0" and column "A77" is a floating-point number representing the interaction of 'AUDIENCE 77" with "BILLBOARD 0" over a particular time period. Examples of creating and quantifying audience-location metrics 440 are described in detail below.

In various embodiments, some audience-location metrics 440 indicate a non-existent or negligible interaction between a particular audience and a location. For example, FIG. 4 depicts column A1 showing a non-existent relationship with several billboards. Specifically, blank spaces are shown in the intersection of A1 with billboards BB06 and BB07. Other audience-location metrics may show a negligible interaction between an audience and a location. For example, FIG. 4 depicts column A78 showing several negligible relationships with several billboards. Specifically, dashed lines are shown in the intersection of A78 with billboards BB0 through BB07. In various embodiments, a negligible interaction is a number or rate of interaction between an audience and a location that occurs so infrequently that the audience-location metric 440 would not be consequential to the generation of a location recommendation if used. In various further embodiments, a threshold value is used to determine whether a specific audience-location metric is negligible.

Data system 400 comprises difference table 450. Difference table 450 may correspond to a determined numerical level of differences between a particular first location and a number of additional locations. For example, FIG. 4 depicts difference table 450 as assigning a difference metric to each billboard BB1 through BB10 based on the difference between the ORIGIN billboard BB0 and the particular other billboard. In various embodiments, a larger difference metric comprises a deviation metric comparing the numerical difference across each audience metric for the ORIGIN location and an additional location. In these cases, a lower deviation metric represents a closer correlation between audience metrics for the ORIGIN location and the additional location. In various embodiments, the difference metric is a cohesion metric comparing the numerical similarity across each audience metric for the ORIGIN location and an additional location. In these cases, a higher cohesion metric represents a closer correlation between audience metrics for the ORIGIN location and the additional location.

In various embodiments, audience location metrics 440 are determined based on the transformation of audience statistics into numerical values. For example, a set of digital identifiers associated with a general public may be converted into numerical floating-point values by calculating lift values per location and/or audience as explained above. In various embodiments, given a set of venues to compare to an origin venue, a fraction of unavailable or negligible metrics per coordinate may be computed. Coordinates or location with a relative fraction of such metrics greater than a threshold value may be ignored for these calculations.

In various embodiments, difference tables and difference metrics are determined based on weighted calculation and summation of difference values between the audience-location metrics in a data table. As a result, the output of generating a difference table is a distance scalar per location from an origin location. Such a distance calculation may be represented by the distance equation $$d^2(u, v) = \sum_i K(h_i)\left[(v_i - u_i)^2 I(u_i \neq NaN) + \varepsilon I(u_i = NaN)\right]$$

where $d^2(u,v)$ is the squared distance value between two locations represented by the distance metric in the distance table, u is a row corresponding to a potentially recommended location, v is a row corresponding to the input origin location, $K(h_i)$ is a polynomial kernel chosen by an operator of the back-end system and represented by $h_i^k$, $v_i$ is a specific audience-location metric at the "i" column of the table, $u_i$ is a specific audience-location metric at the "i" column of the table, $\varepsilon$ is a replacement value for unavailable or negligible audience-location metrics, and $u_i$=NaN is the presence of an unavailable or negligible audience-location metric at $u_i$.

In various embodiments, an exponential function may be used instead of a polynomial kernel, in which case the value of K(h) is $e^{-h}$. In the equation above, given a one-on-one comparison of venues is desired, an origin venue represented by v is given, and a distance to another venue u is computed using only metrics where $v_i$ is available and non-negligible. The calculated distance is a weighted Euclidean distance, where unavailable or negligible metrics are calculated as entries penalized by a value of $\varepsilon$. Steps for such calculations include a computation of $\mu_i$ and $\sigma_i$ per audience, where pi, and a, represent the mean and standard deviation respectively. In this case, $v_i$ and NaN are omitted from the equation. The equation $h_i=(\mu_i-v_i)/\sigma_i$ is then calculated and the distance is computed based on the distance equations above.

In various embodiments, a set of venues to compare to an origin venue is represented by g. A distance between locations is a calculated as a weighted Euclidean distance, where unavailable or negligible metrics are calculated as entries penalized by a value of $\varepsilon$. First, for each audience, the mean and standard deviation $\mu_i$ and $\sigma_i$ are calculated utilizing data that does not correspond to g, and the mean and standard deviation $v_i$ and $s_i$ are calculated utilizing data that does correspond to g. Then, for a particular additional venue u, the equation $$d^2(u, g) = \sum_i K_1(h_i) K_2(s_i/\sigma_i)\left[(v_i - u_i)^2 I(u_i \neq NaN) + \varepsilon I(u_i = NaN)\right]$$

is used to calculate the distance score. In this case, $K_1$ and $K_2$ may be different kernels.

A potential calculation chart for these procedures is seen below:

| | A1 | A2 | A3 | A4 | A5 | A6 | A7 | A8 | A9 | A10 |
|---|---|---|---|---|---|---|---|---|---|---|
| | | | | | Input | | | | | |
| b0 (origin) | | 0.67 | 1.01 | 0.44 | 0.57 | 0.46 | 0.32 | | 0.75 | 0.71 |
| b1 | | 1.44 | 1.01 | 4.11 | 2.54 | | 2.02 | | 1.38 | 1.57 |

|  | A1 | A2 | A3 | A4 | A5 | A6 | A7 | A8 | A9 | A10 |
|---|---|---|---|---|---|---|---|---|---|---|
| | Compute statistics over all billboards excluding b0 and NaN entries | | | | | | | | | |
| mu | 1.06 | 0.90 | 1.26 | 1.12 | 1.07 | 1.10 | 1.00 | 1.04 | 1.09 | 1.33 |
| std | 0.32 | 0.26 | 0.78 | 0.53 | 0.55 | 0.66 | 0.47 | 0.17 | 0.43 | 0.55 |
| | Compute weight for each column | | | | | | | | | |
| h = \|(b0 − mu)/std\| | 1.23 | 0.44 | 1.05 | 1.04 | 1.13 | 1.19 | | 1.65 | 0.88 | |
| w = exp(−h) | 0.29 | 0.65 | 0.35 | 0.35 | 0.32 | 0.30 | | 0.19 | 0.42 | |
| | Compute weighted distance | | | | | | | | | |
| d = ((b0 − b1) ^ 2).fillna(0.3) | 0.60 | 0.00 | 13.50 | 3.88 | 0.30 | 2.88 | | 0.40 | 0.74 | |
| wd = w * d | 0.18 | 0.00 | 4.72 | 1.37 | 0.10 | 0.87 | 0.00 | 0.08 | 0.31 | 0.00 |
| Distance = sqrt(sum(wd)) | | | | | 2.76 | | | | | |

3.2 Providing Location Recommendations Based on a Known Location

Figure 5:
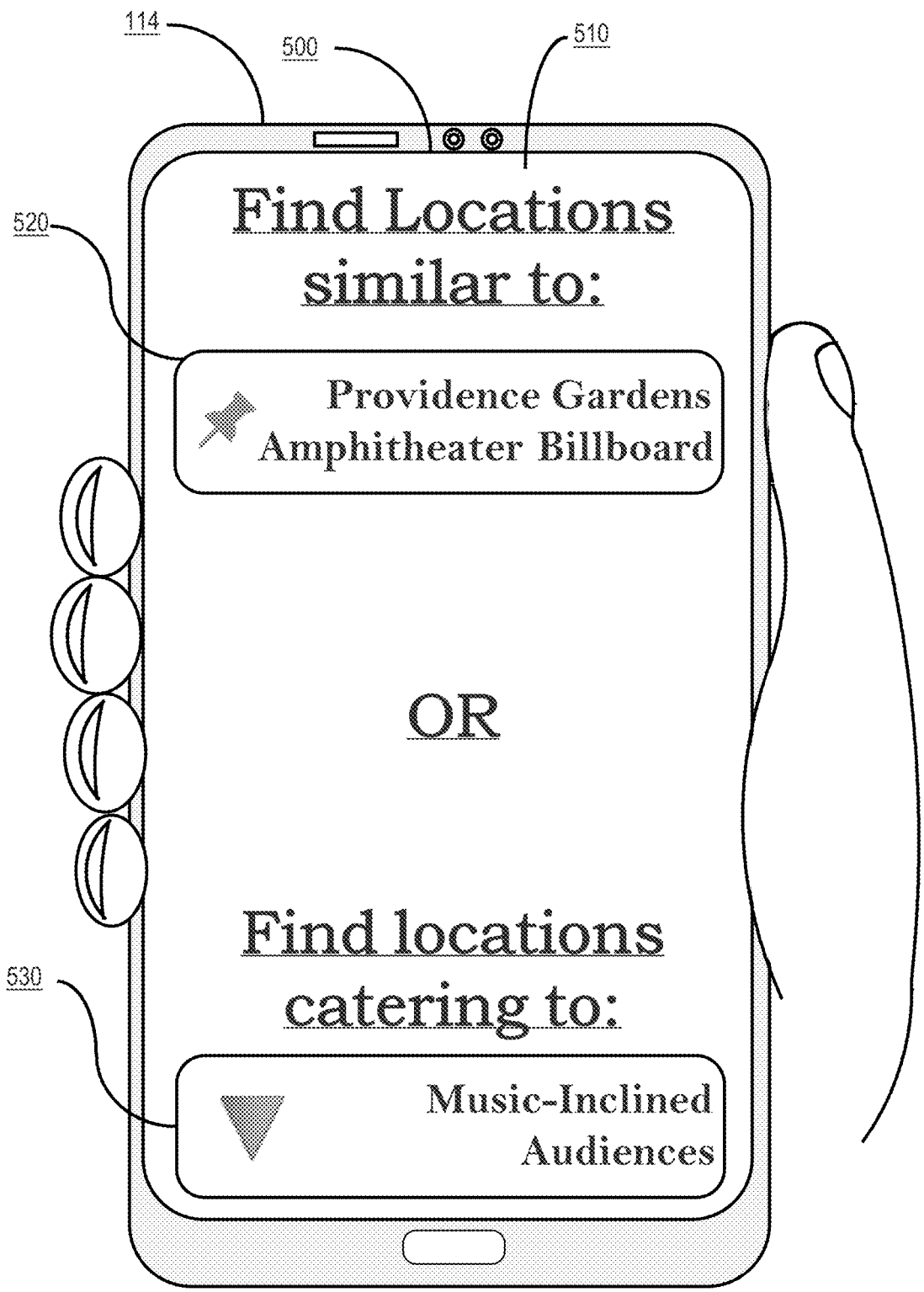
FIG. 5 illustrates an example user interface for facilitating a location recommendation process according to various embodiments.

FIG. 5 illustrates an example user interface for facilitating a location recommendation process according to various embodiments. Specifically, FIG. 5 depicts an example graphical user interface for requesting location recommendations. The interface is depicted on a user device 114. User device 114 comprises a mobile device screen 500 through which a human user may interact with the user device 114. Mobile device screen 500 displays mobile interface 510 through which the user may interact with software installed at user device 114 for facilitating a location recommendation process. Mobile interfaces may contain instructions or features that are interactive and through which a user of user device 114 may initiate a location recommendation process, such as process 200.

As depicted in FIG. 5, mobile interface 510 shows instructions for generating recommended locations through these processes. For example, mobile interface 510 comprises the option to select an initial location on mobile location selector 520 to generate a location recommendation. In various embodiments, a user of user device 114 may select a location, feature, billboard, digital advertising medium, or other location-based entity, as the basis for which a location recommendation may be made. In various further embodiments, mobile location selector 520 is an interactive list of locations that a user may select from. In various embodiments, selecting a location at mobile location selector 520 will send the selected location to a back-end system to begin a location recommendation process, similar to steps 210 or 310 as described herein.

Alternatively, mobile interface 510 comprises the option to select an initial audience metric on mobile metric selector 530 to generate a location recommendation. The initial audience metric selector 530 may allow a user of user device 114 to select a particular audience metric which is an optimal audience metric for a sought location. In various embodiments, selecting an audience metric at audience metric selector 530 will initiate a process at a back-end system that will recommend a nearby location having an optimal audience metric that is similar to the selected metric. For example, the audience metric "MUSIC-INCLINED AUDIENCES" is selected in FIG. 5 at audience metric selector 530. As a result, a location recommendation system may search for a location having a highest audience-location metric 440 nearby and return that location to the user device 114.

Figure 6:
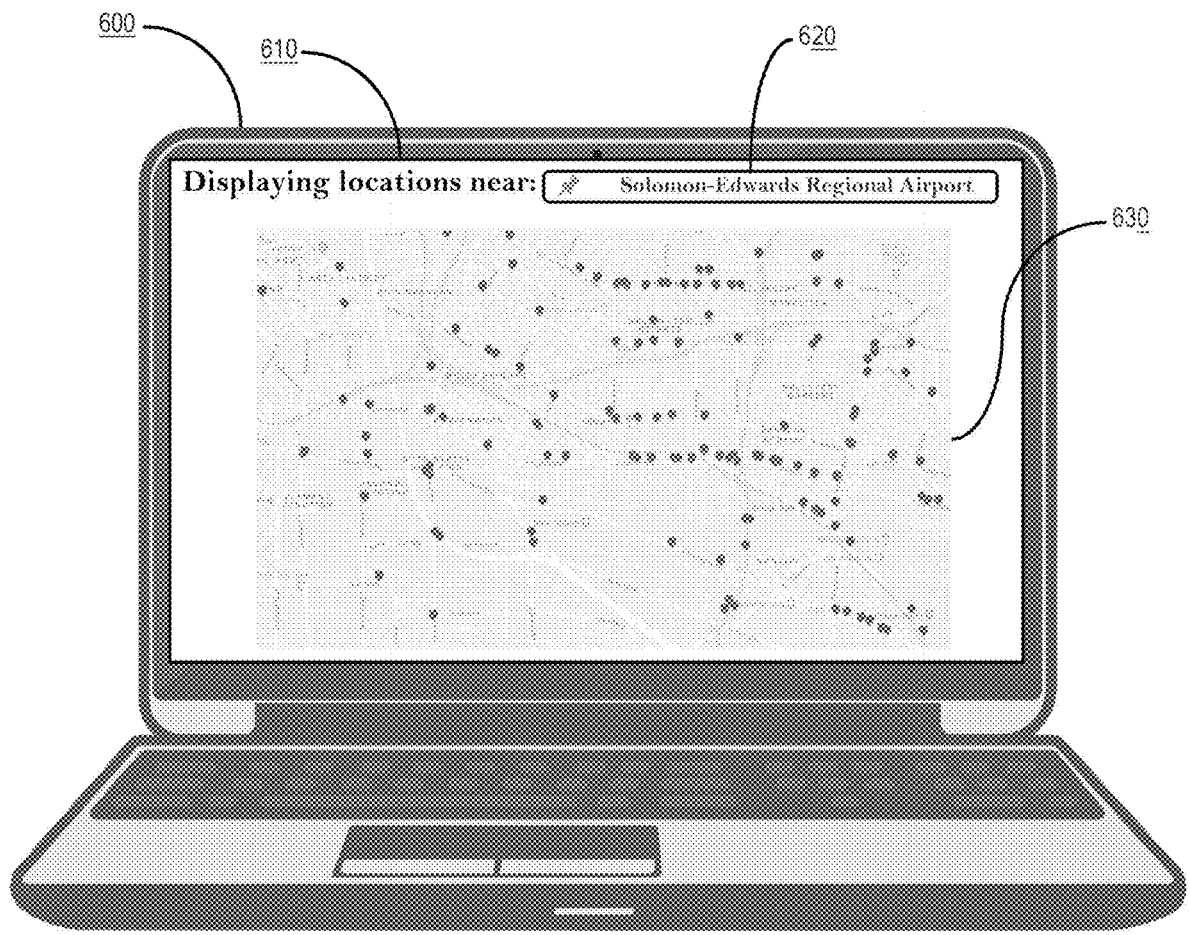
FIG. 6 illustrates an example user interface for facilitating a location recommendation process according to various embodiments.

FIG. 6 illustrates an example user interface for facilitating a location recommendation process according to various embodiments. As one example, FIG. 6 depicts an example graphical user interface for requesting location recommendations. The interface is shown on computer device 600 and comprises a streamlined presentation of location recommendations. Computer device 600 comprises computer screen 610 on which the interface is shown. Computer screen 610 depicts an input for an initial location at computer location input 620 and a resulting location map at a computer location map 630. Computer location input 620 comprises a selectable locator for a first location which will be the subject of a location recommendation action. Computer location map 630 displays the results of the location recommendation action initiated by selecting the location at computer location input 620.

For example, as depicted in FIG. 6, a user has selected "SOLOMON-EDWARDS REGIONAL AIRPORT" as the primary location. The primary location is sent to the back-end system, where the audience metrics for the primary location are compared to several other additional locations having similar audience metrics. Several locations having geographic proximity to the primary location and having audience metrics that are similar to the primary location are then sent in recommendation data back to computer device 600. A software program or interface at computer device 600 receives and manipulates the received data to display the recommendations on computer location map 630.

3.3 Mapping and Displaying Location Recommendations

Figure 7:
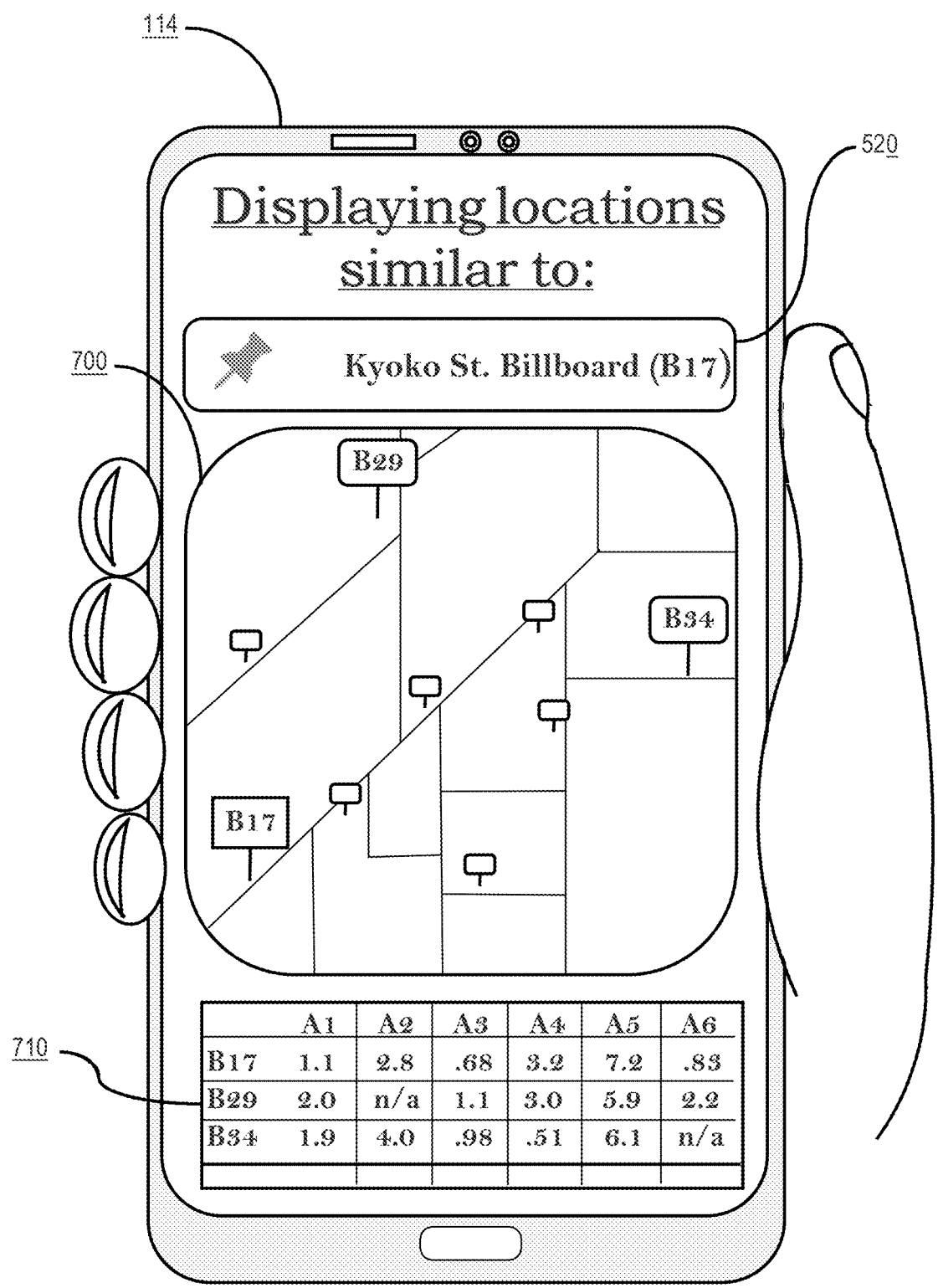
FIG. 7 illustrates an example user interface for facilitating a location recommendation process according to various embodiments.

FIG. 7 illustrates an example user interface for facilitating a location recommendation process according to various embodiments. Specifically FIG. 7 depicts an example graphical user interface for viewing location recommendations. User device 114 displays the user interface, which in various embodiments is a resulting interface after using the interface depicted in FIG. 5. For example, FIG. 7 depicts the result of selecting an initial location using mobile location selection 520. As shown in the interface, a primary location of "KYOKO ST. BILLBOARD" is selected. A location identifier 420 depicted as "B17" is shown alongside the selected location, corresponding to the item's identification in a data table 410. As a result of the selection, a location recommendation process is initiated, and location recommendation data is received at user device 114.

Mobile map 700 is displayed showing generated location recommendation data. Specifically, the interface 116 of the user device 114 displays the location recommendation data in a map format based on the returned result. For example, interface 116 shows a map with several billboards nearby the selected billboard B17. As a result of the location recommendation process, billboards "B29" and "B34" are identified as the more similar billboards to B17. These results are shown in the mobile map 700 as highlighted locations. The location recommendation data may be further shown by mobile table 710 depicted the relevant audience metrics in generating the location recommendation data. For example, mobile table 710 depicts the audience-location metrics 440 for the highlighted locations B29 and B34 as well as the audience-location metrics 440 for the selected location B17.

3.4 Providing Location Recommendations Based on a Known Audience

Figure 8:
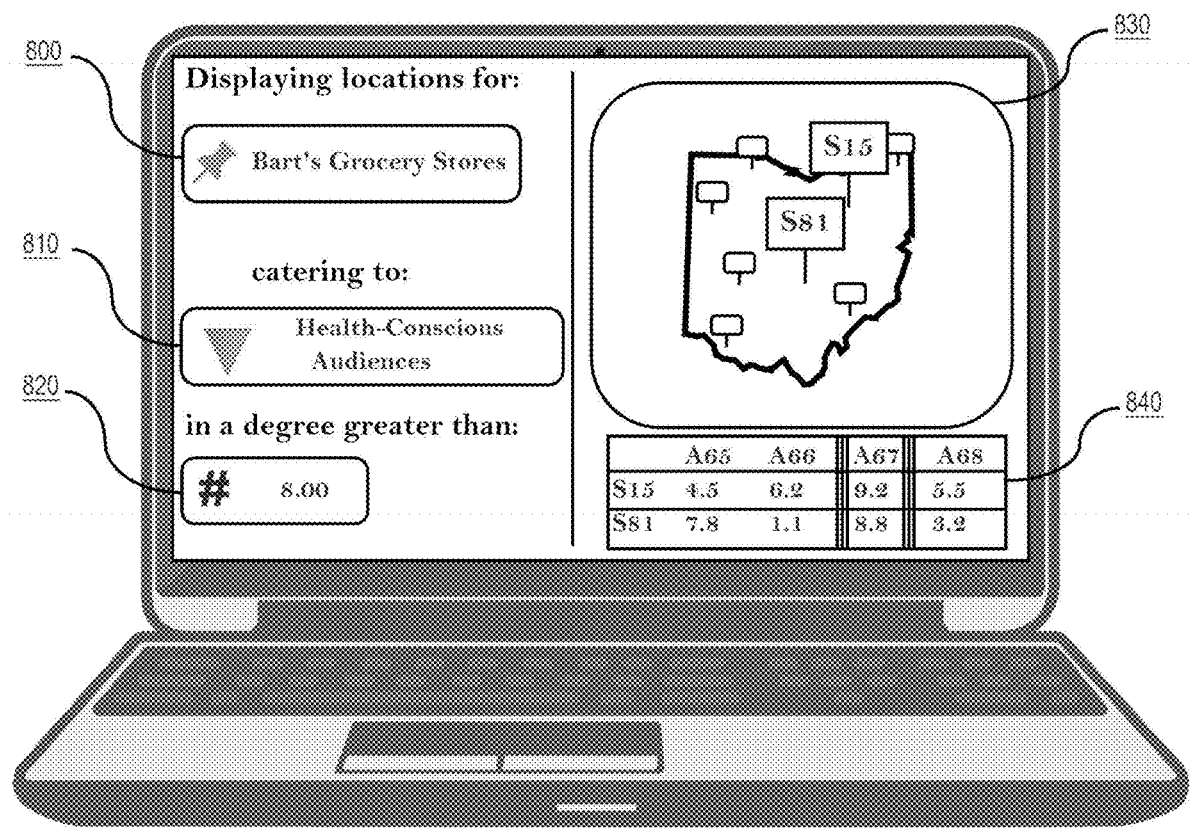
FIG. 8 illustrates an example user interface for facilitating a location recommendation process according to various embodiments.

FIG. 8 illustrates an example user interface for facilitating a location recommendation process according to various embodiments. As one example, FIG. 8 depicts an example graphical user interface for viewing location recommendations. For example, FIG. 8 depicts the result of a search conducted based on an existing entity and audience metrics instead of a particular singular sample location. The user interface shows the results of searching for particular recommended locations based on these metrics. Computer entity selector 800 may allow a user of the computing device to select a known entity that may operate in multiple locations. For example, computer entity selector 800 shows a selected entity of "BART'S GROCERY STORES." Computer audience selector 810 may allow a user of the computing device to select a particular audience metric on which to base a search. For example, computer audience selector 810 shows a selected audience metric of HEALTH-CONSCIOUS AUDIENCES." Computer threshold selector 830 may allow a user of the computer device to select a threshold to further narrow the recommendation possibilities. For example, computer threshold selector 830 shows a selected metric of audience-location metrics greater than "8.00."

The result of these selections is sending these parameters to a back-end system, which will search a data table 410 for a location corresponding to BART'S GROCERY STORES having a tangible audience interaction with HEALTH-CONSCIOUS AUDIENCES and the intersection of these results should be greater than 8.00. The resulting recommendation results are shown in computer map 830 and computer table 840. For example, computer map 830 shows a geographical display showing several locations found by the back-end system. Recommendation data is displayed on computer map 830 representing positive results for the search selection. For example, as depicted in FIG. 8, two locations, S15 and S81 are discovered meeting the necessary parameters. The specific data table entries for the recommended locations are further shown in computer table 840 to highlight the results of the recommendation search.

4. Hardware and Software Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
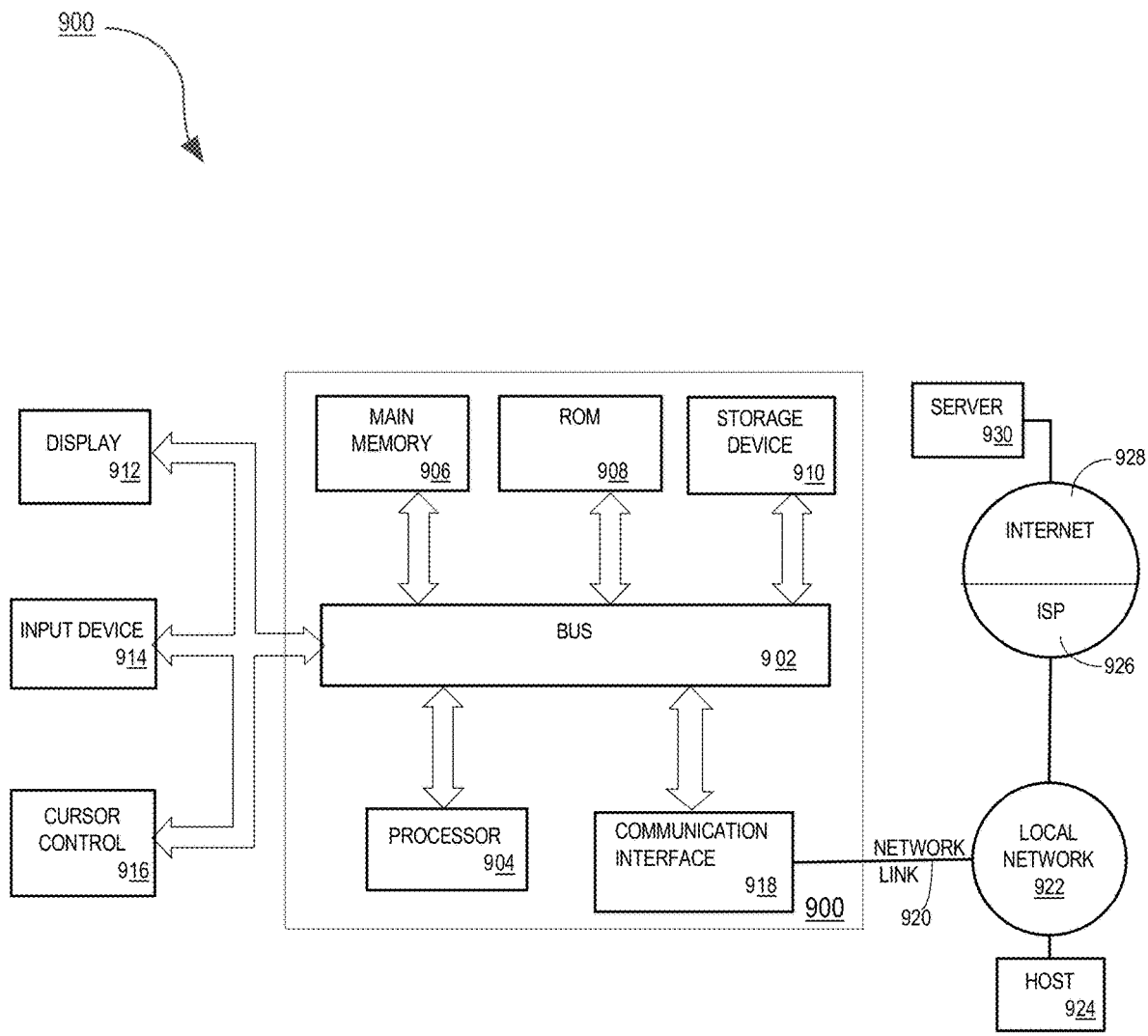
FIG. 9 illustrates an example computer hardware system with which an embodiment may be implemented.

For example, FIG. 9 is a block diagram that illustrates a computer system 900 upon which an embodiment may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Non-volatile media may also include persistent memory, such as MRAM or PCM, like 3DXPoint from Intel which can be used as a part of main memory. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Figure 10:
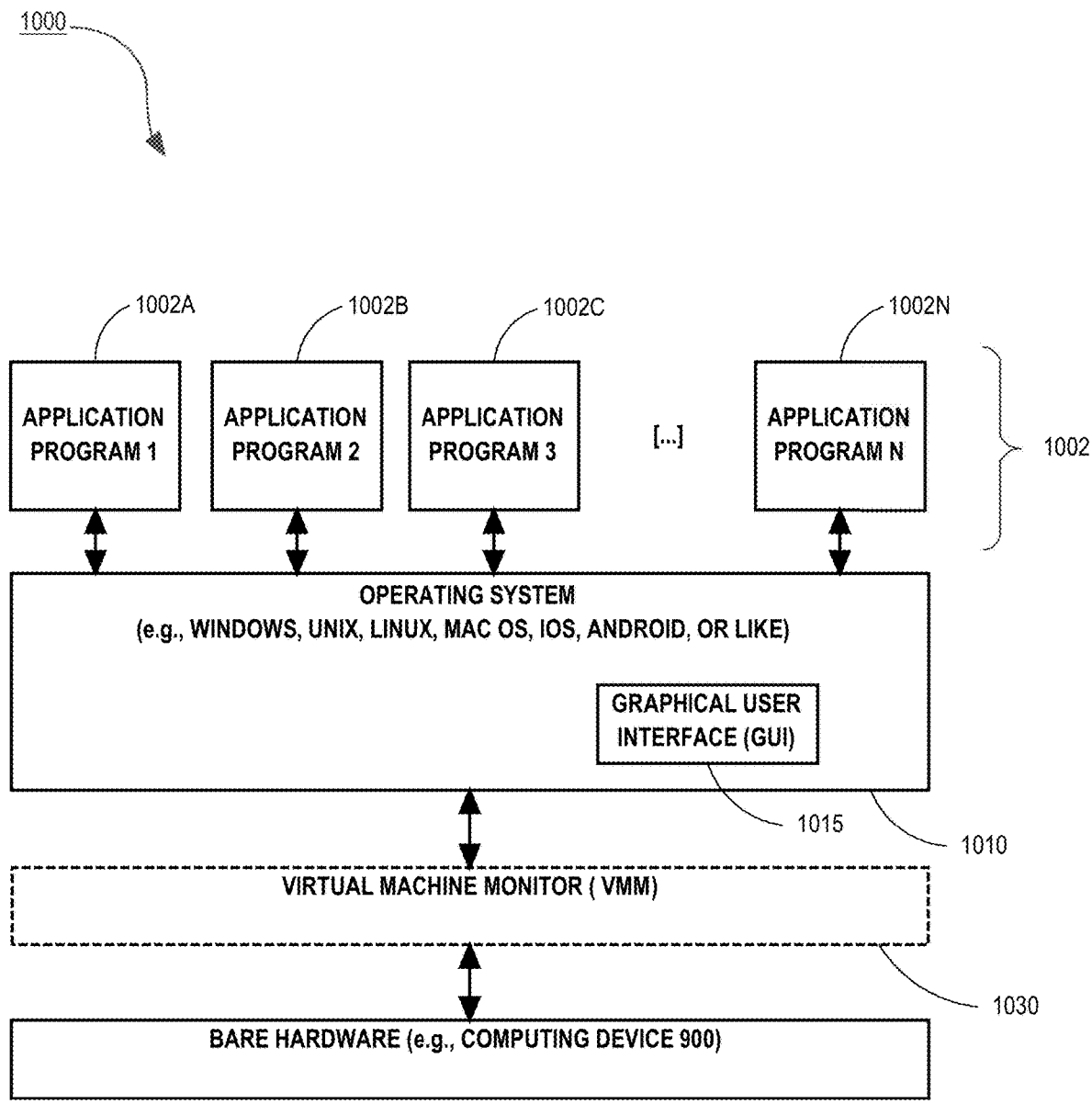
FIG. 10 illustrates an example computer software system with which an embodiment may be implemented.

FIG. 10 is a block diagram of a software system 1000 that may be employed for controlling the operation of computer system 1000. Software system 1000 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1000 is provided for directing the operation of computer system 500. Software system 1000, which may be stored in system memory (RAM) and on fixed storage (e.g., hard disk or flash memory) 910, includes a kernel or operating system (OS) 1010.

The OS 1010 manages low-level aspects of computer operation, including managing execution of processes, memory allocation, file input and output (I/O), and device I/O. One or more application programs, represented as 1002A, 1002B, 1002C . . . 1002N, may be "loaded" (e.g., transferred from fixed storage into memory) for execution by the system. The applications or other software intended for use on a system may also be stored as a set of downloadable computer-executable instructions, for example, for downloading and installation from an Internet location (e.g., a Web server, an app store, or other online service).

Software system 1000 includes a graphical user interface (GUI) 1015, for receiving user commands and data in a graphical (e.g., "point-and-click" or "touch gesture") fashion. These inputs, in turn, may be acted upon by the system 900 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on bare hardware (e.g., processor(s)) utilizing system 1000. Alternatively, a hypervisor or virtual machine monitor (VMM) 1030 may be interposed between the bare hardware and the OS 1010. In this configuration, VMM 1030 acts as a software "cushion" or virtualization layer between the OS 1010 and the bare hardware of the system.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware of a system directly. In these instances, the same version of the guest operating system configured to execute on the bare hardware directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

The above-described basic computer hardware and software is presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

5. Practical Applications

When considered in light of the specification herein, and its character as a whole, this disclosure is directed to improvements in the recommendation and implementation of activities at a particular location catering to one or more specific audiences. The disclosure is not intended to cover or claim the abstract model of mathematically comparing one or more database items, but rather, the technical improvements of responsively generating optimized and efficient location recommendation data based on previously unknown input parameters from the client entity. By implementing a system that can intake previously unknown location or audience parameters sought by an entity and responsively generate optimized location recommendation data which improves location utilization and resource expenditure, the field of location and audience-based services is improved.

Practical applications of various embodiments and methods include comparing a particular location, venue, or region to any other similar location, venue or region to efficiently identify relevant factors of difference and similarity between the compared entities irrespective of pure geographic proximity. Another practical application is the ability to compare a singular location to a variety of locations to determine a set of differences between the locations and narrowly tailor difference data to show optimized recommendations for correlations between locations. Yet another practical application is the ability to group similar locations based on traits or audiences or visitors to the locations in order to further classify venues and audiences and improve electronic data retention and recommendation processes. For example, different retail entities may be grouped together based on the similarities of their audiences to show an effective audience demographic for a set of stores, or alternatively, a similar retail entity may be differentiated by audience behaviors at each separate retail store, allowing the entity to more carefully choose how to efficiently relocated specific retail items.

Another practical application is the use of previous location data to generate new and unique recommendation data corresponding to a sought customer demographic. For example, a retail entity seeking a location for a new store may use existing location data to determine an optimal location in which to place a new store in order to maximize retail profit and minimize risk of resource drain. Yet another practical application is to create efficient grouping and metrics for audiences and locations for coordinating a social campaign. For example, a campaign or advertising operation may optimally migrate to new efficient advertising locations based on previous demographic and audience metrics and expected demographic and audience metrics at a new location. Another practical application is the ability to identify a control group or control audience for a social campaign. For example, based on several locations in which a campaign is slated to begin, a new control location may be identified in which to test the campaign on a control audience before it is released to the several locations.

What is claimed is:
1. A computer-implemented method comprising:
receiving digital electronic first location data representing a first geographical location associated with one or more audiences, each audience comprising a plurality of electronic identifiers that share at least one metadata attribute;
generating and storing in digital data storage, one or more first audience metrics for the first geographical location, the first audience metrics corresponding to a degree of networked computer interaction between each audience of the one or more audiences and the first geographical location;

receiving, from a computer database, second location data, the second location data representing one or more additional geographical locations associated with the one or more audiences, the second location data comprising one or more second audience metrics for each additional geographical location, each of the one or more additional geographical locations being different than the first geographical location;

determining that one or more of the first audience metrics or the second audience metrics indicate negligible interaction between an audience and a location;

determining, from the first location data and the second location data, an expected audience metric for the negligible interaction metrics;

based on a comparison of the one or more first audience metrics with the one or more second audience metrics, generating and digitally storing location recommendation data that selects one of the one or more additional geographical locations as being a location that is most similar to the first geographic location amongst the one or more additional geographical locations, the generating and digitally storing the location recommendation data comprising utilizing at least one determined expected audience metric to determine one or more additional geographical locations for inclusion in the location recommendation data;

sending, to a client device, the location recommendation data indicating a physical location of the one additional geographical location selected in the location recommendation data.

2. The computer-implemented method of claim 1, wherein:

the digital electronic first location data further comprises physical coordinates of the first geographical location;

the second location data further comprises physical coordinates of the one or more additional geographical locations;

generating and digitally storing location recommendation data further comprises selecting the one of the one or more additional geographical locations based in part on physical proximity between the physical coordinates of the first geographical location and the physical coordinates of the one or more additional geographical locations.

3. The computer-implemented method of claim 1, wherein generating and digitally storing location recommendation data further comprises:

computing, based on the first location data and the second location data, two or more standard audience metrics, each standard audience metric of the standard audience metrics corresponding to an average degree of a particular audience interaction among all locations;

computing, based on the two or more standard audience metrics, one or more difference degree metrics between the first geographical location and the one or more additional geographical locations;

selecting, based on the one or more difference degree metrics, the one of the one or more additional geographical locations having the lowest difference degree metric.

4. The computer-implemented method of claim 1, further comprising:

determining, for a particular additional geographical location of the one or more additional geographical locations, a total number of audience metrics indicating negligible interaction between an audience and a location;

determining that the total number of audience metrics indicating negligible interaction is greater than or equal to a threshold number of negligible interaction metrics;

in response to determining that the total number is greater than or equal to the threshold number, excluding the particular additional geographical location from the location recommendation data.

5. The computer-implemented method of claim 1, wherein:

each of the first geographic location and the one or more additional geographical locations corresponds to a geographic region;

the first location data comprises a first geographic region;

the second location data comprises one or more additional geographic regions; and generating and digitally storing location recommendation data comprises determining, for inclusion in the location recommendation data, at least one additional geographical location of the one or more additional geographical locations that comprises a geographic region that is same as the first geographic region.

6. The computer-implemented method of claim 1, wherein:

each of the first geographic location and the one or more additional geographical locations is associated with a best audience group that corresponds to an audience having the highest degree of interaction with the associated geographical location;

the first location data comprises a first best audience group;

the second location data comprises one or more additional best audience groups;

generating and digitally storing location recommendation data comprises determining at least one additional geographical location of the one or more additional geographical locations to include in the location recommendation data based on the first best audience group being similar to the additional best audience group of the additional geographical location.

7. A system comprising:

a user device executing a recommendation software service;

a computing device executing a recommendation generation service;

a computer database storing electronic identifiers and metadata;

a processor and main memory comprising instructions which, when executed, cause:

receiving, by the computing device, from the user device, digital electronic first location data representing a first geographical location associated with one or more audiences, each audience comprising a plurality of electronic identifiers that share at least one metadata attribute;

generating and storing, by the computing device, in digital data storage, one or more first audience metrics for the first geographical location, the first audience metrics corresponding to a degree of networked computer interaction between each audience of the one or more audiences and the first geographical location;

receiving, from the computer database, second location data, the second location data representing one or more additional geographical locations associated with the one or more audiences, the second location data comprising one or more second audience metrics for each additional geographical location, each of the one or more additional geographical locations being different than the first geographical location;

determining that one or more of the first audience metrics or the second audience metrics indicate negligible interaction between an audience and a location;

determining, from the first location data and the second location data, an expected audience metric for the negligible interaction metrics;

based on a comparison of the one or more first audience metrics with the one or more second audience metrics, generating and digitally storing location recommendation data that selects one of the one or more additional geographical locations as being a location that is most similar to the first geographic location amongst the one or more additional geographical locations, the generating and digitally storing the location recommendation data comprising utilizing at least one determined expected audience metric to determine one or more additional geographical locations for inclusion in the location recommendation data;

sending, to a client device, the location recommendation data indicating a physical location of the one additional geographical location selected in the location recommendation data.

8. The system of claim 7, wherein:
the digital electronic first location data further comprises physical coordinates of the first geographical location;
the second location data further comprises physical coordinates of the one or more additional geographical locations;
generating, digitally storing, and sending the location recommendation data further comprises selecting the one of the one or more additional geographical location based in part on physical proximity between the physical coordinates of the first geographical location and the physical coordinates of the one or more additional geographical locations.

9. The system of claim 7, wherein generating, storing and sending the location recommendation data further comprises:
computing, based on the first location data and the second location data, two or more standard audience metrics, each standard audience metric of the standard audience metrics corresponding to an average degree of a particular audience interaction among all locations;
computing, based on the two or more standard audience metrics, one or more difference degree metrics between the first geographical location and the one or more additional geographical locations;
selecting, based on the one or more difference degree metrics, the one of the one or more additional geographical locations having the lowest difference degree metric.

10. The system of claim 7, the processor further comprising instructions which when executed cause:
determining, for a particular additional geographical location of the one or more additional geographical locations, a total number of audience metrics indicating negligible interaction between an audience and a location;
determining that the total number of audience metrics indicating negligible interaction is greater than or equal to a threshold number of negligible interaction metrics;
in response to determining that the total number is greater than or equal to the threshold number, excluding the particular additional geographical location from the location recommendation data.

11. The system of claim 7, wherein:
each of the first geographic location and the one or more additional geographical locations corresponds to a geographic region;
the first location data comprises a first geographic region;
the second location data comprises one or more additional geographic regions; and
generating and digitally storing location recommendation data comprises determining, for inclusion in the location recommendation data, at least one additional geographical location of the one or more additional geographical locations that comprises a geographic region that is same as the first geographic region.

12. The system of claim 7, wherein:
each geographical location is associated with a best audience group, the best audience group corresponding to an audience having the highest degree of interaction with the geographical location;
the first location data comprises a first best audience group;
the second location data comprises one or more additional best audience groups;
generating and digitally storing location recommendation data comprises determining at least one additional geographical location of the one or more additional geographical locations to include in the location recommendation data based on the first best audience group being similar to the additional best audience group of the additional geographical location.

13. One or more non-transitory computer-readable media storing instructions which, when executed by one or more processors, cause:
receiving digital electronic first location data representing a first geographical location associated with one or more audiences, each audience comprising a plurality of electronic identifiers that share at least one metadata attribute;
generating and storing in digital data storage, one or more first audience metrics for the first geographical location, the first audience metrics corresponding to a degree of networked computer interaction between each audience of the one or more audiences and the first geographical location;
receiving, from a computer database, second location data, the second location data representing one or more additional geographical locations associated with the one or more audiences, the second location data comprising one or more second audience metrics for each additional geographical location, each of the one or more additional geographical locations being different than the first geographical location;
determining that one or more of the first audience metrics or the second audience metrics indicate negligible interaction between an audience and a location;
determining, from the first location data and the second location data, an expected audience metric for the negligible interaction metrics;
based on a comparison of the one or more first audience metrics with the one or more second audience metrics, generating and digitally storing location recommendation data that selects one of the one or more additional geographical locations as being a location that is most similar to the first geographic location amongst the one or more additional geographical locations, the generating and digitally storing the location recommendation data comprising utilizing at least one determined expected audience metric to determine one or more additional geographical locations for inclusion in the location recommendation data;

sending, to a client device, the location recommendation data indicating a physical location of the one additional geographical location selected in the location recommendation data.

14. The computer-readable media of claim 13, wherein:

the digital electronic first location data further comprises physical coordinates of the first geographical location;

the second location data further comprises physical coordinates of the one or more additional geographical locations;

generating and digitally storing location recommendation data further comprises selecting one of the one or more additional geographical location based in part on the physical proximity between the physical coordinates of the first geographical location and the physical coordinates of the one or more additional geographical locations.

15. The computer-readable media of claim 13, wherein generating and storing location recommendation data further comprises:

computing, based on the first location data and the second location data, two or more standard audience metrics, each standard audience metric of the standard audience metrics corresponding to an average degree of a particular audience interaction among all locations;

computing, based on the two or more standard audience metrics, one or more difference degree metrics between the first geographical location and the one or more additional geographical locations;

selecting, based on the one or more difference degree metrics, the one of the one or more additional geographical locations having the lowest difference degree metric.

16. The computer-readable media of claim 13, further comprising instructions which, when executed by one or more processors, cause:

determining that one or more of the first audience metrics or the second audience metrics indicate negligible interaction between an audience and a location;

determining that the total number of audience metrics indicating negligible interaction is greater than or equal to a threshold number of negligible interaction metrics;

in response to determining that the total number is greater than or equal to the threshold number, excluding the particular additional geographical location from the location recommendation data.

17. The computer-readable media of claim 13, wherein:

each of the first geographic location and the one or more additional geographical locations corresponds to a geographic region;

the first location data comprises a first geographic region;

the second location data comprises one or more additional geographic regions; and generating and digitally storing location recommendation data comprises determining, for inclusion in the location recommendation data, at least one additional geographical location of the one or more additional geographical locations that comprises a geographic region that is same as the first geographic region.

* * * * *